United States Patent [19]

Ueyama et al.

[11] Patent Number: 5,562,528
[45] Date of Patent: Oct. 8, 1996

[54] MACHINE TOOL

[75] Inventors: Hirochika Ueyama, Hirakata; Yasuhiro Yukitake, Kashiwara, both of Japan

[73] Assignee: Koyo Seiko Co., Ltd., Osaka, Japan

[21] Appl. No.: 321,872

[22] Filed: Oct. 14, 1994

[30] Foreign Application Priority Data

Oct. 15, 1993 [JP] Japan .................. 5-258532

[51] Int. Cl.[6] .................. B24B 49/00
[52] U.S. Cl. .................. 451/11; 310/90.5
[58] Field of Search .................. 451/11, 342, 343, 451/360, 294; 310/90.5

[56] References Cited

U.S. PATENT DOCUMENTS

| | | | |
|---|---|---|---|
| 4,180,946 | 1/1980 | Heijkenskjold et al. | 451/294 |
| 4,629,262 | 12/1986 | Hamilton | 310/90.5 |
| 5,024,025 | 6/1991 | Kihara et al. | 451/11 |
| 5,133,158 | 7/1992 | Kihara et al. | 451/11 |
| 5,205,078 | 4/1993 | Takara et al. | 451/11 |
| 5,455,472 | 10/1995 | Weiss et al. | 310/90.5 |

*Primary Examiner*—D. S. Meislin
*Assistant Examiner*—Andrew Weinberg
*Attorney, Agent, or Firm*—Popham Haik, Schnobrich & Kaufman, Ltd.

[57] ABSTRACT

A machine tool comprises a spindle device carrying a tool element attached to the forward end of a rotor spindle drivingly rotatable as supported by a control-type magnetic bearing device, a working force calculating unit for calculating a working force acting on the tool element upon the tool element coming into contact with a workpiece based on exciting current of a magnetic bearing of the bearing device, and a discriminating unit for discerning whether the contact of the tool element with the workpiece is normal or abnormal based on variations in the working force.

7 Claims, 4 Drawing Sheets

5,562,528

MACHINE TOOL

BACKGROUND OF THE INVENTION

The present invention relates to machine tools, such as internal grinding machines, comprising a spindle device wherein a tool is attached to the forward end of a drivingly rotatable rotor spindle supported by a magnetic bearing device of the control type.

With internal grinding machines and like machine tools, the rotor spindle of the spindle device included therein is generally supported by usual bearings of the contact type such as antifriction bearings made of steel or antifriction bearings of ceramic. However, with a demand for improved productivities in recent years, there arises a need for high-speed rotation and higher feed speeds for working. Accordingly, it has been proposed to support the rotor spindle contactlessly by a magnetic bearing device of the control type.

Further for use in machine tools wherein the spindle device is contactlessly supported by such a control-type magnetic bearing device, a contact position detector has been proposed which is so adapted that when the exciting current of the magnetic bearing of the bearing device has exceeded a predetermined threshold value, this is interpreted as indicating the contact of the tool with the workplace (see Unexamined Japanese Patent Publication HEI 1-252343).

Machine tools such as internal grinding machines are generally so designed that the spindle device is moved at a high fast feed speed until the tool approaches the workpiece to some extent and thereafter moved at a low working feed-speed for working. If the mounted position of the tool or workplace involves an error, therefore, the tool is likely to collide with the workplace during fast feed. When the collision of the tool with the workpiece can be detected in such a case, damage to the tool is avoidable. Nevertheless, the conventional contact position detector merely checks whether the exciting current of the magnetic bearing has exceeded the threshold value to detect the contact of the tool with the workpiece and is accordingly unable to detect the degree of contact. The exciting current through the magnetic bearing exceeds the threshold value upon the tool colliding with the workpiece at the fast feed speed and while the tool in working on the workpiece at the working feed speed in contact therewith, so that the detector fails to distinguish between the abnormal collision and the usual working operation.

SUMMARY OF THE INVENTION

An object of the present invention is to overcome the above problem and to provide a machine tool which is adapted to reliably detect an abnormal collision only of its component tool to prevent damage thereto.

The present invention provides a machine tool which comprises a spindle device carrying a tool element attached to the forward end of a rotor spindle drivingly rotatable as supported by a control-type magnetic bearing device, working force calculating means for calculating a working force acting on the tool element upon the tool element coming into contact with a workpiece based on exciting current of a magnetic bearing of the magnetic bearing device, and discriminating means for discerning whether the contact of the tool element with the workpiece is normal or abnormal based on variations in the working force.

Preferably, the discriminating means determines the rate of increase of the working force, compares the increase rate of the working force with a predetermined reference increase rate and construes the contact of the tool element with the workpiece as abnormal when the working force increase rate has exceeded the reference increase rate.

Further preferably, the discriminating means comprises a differentiation circuit for calculating the rate of increase of the working force, and a comparison circuit for comparing the working force increase rate calculated by the differentiation circuit with a predetermined reference increase rate and outputting an abnormality signal indicating that the contact of the tool element with the workpiece is abnormal when the working force increase rate has exceeded the reference increase rate.

The working force calculating means calculates the working force acting on the tool element upon the tool element coming into contact with the workpiece based on the exciting current of the magnetic bearing of the bearing device, and the discriminating means discerns whether the contact of the tool element with the workpiece is normal or abnormal based on variations in the working force, so that only abnormal collision of the tool element can be detected reliably.

In a normal case wherein the tool element comes into contact with the workpiece at the working feed speed, the increase rate of the working force is small, whereas in an abnormal case wherein the tool element comes into contact (collision) with the workpiece at the fast feed speed, the working force increase rate is great. Accordingly, abnormal collision of the tool element alone can be detected more reliably when the discriminating means is adapted to determine the increase rate of the working force, compare the increase rate with the predetermined reference increase rate and construe the contact of the tool element with the workpiece as abnormal if the working force increase rate has exceeded the reference increase rate.

With the machine tool of the present invention, only abnormal collision of the tool element can be detected reliably, whereby damage or break of the tool element due to collision can be precluded.

The control-type magnetic bearing device comprises, for example, two radial magnetic bearings arranged respectively at positions spaced apart from each other axially of the spindle for supporting the rotor spindle radially thereof, two radial displacement detecting means arranged respectively at positions spaced apart from each other axially of the spindle for detecting radial displacement of the rotor spindle at their respective positions, and radial control means for controlling the two radial magnetic bearings based on the outputs of the two radial displacement detecting means.

The two radial magnetic bearings each comprise, for example, a pair of first electromagnets and a pair of second electromagnets arranged respectively on two radial axes orthogonal to each other in a plane perpendicular to the axis of the rotor spindle; the two radial displacement detecting means each comprise a pair of first position sensors arranged axially adjacent to the pair of first electromagnets for detecting the position of the rotor spindle with respect to a first radial direction, a first subtracter for determining the displacement of the rotor spindle in the first radial direction by calculating the difference between the outputs of the pair of first position sensors, a pair of second position sensors arranged axially adjacent to the pair of second electromagnets for detecting the position of the rotor spindle with respect to a second radial direction, and a second subtracter for determining the displacement of the rotor spindle in the second radial direction by calculating the difference between the outputs of the pair of second position sensors; and the radial control means comprises a first radial direction controller for controlling the attraction of the first electromagnets based on the output of the first subtracter, and a second radial direction controller for controlling the attraction of the second electromagnets based on the output of the second subtracter.

For example, the first radial direction controller and the second radial direction controller each comprise a translation calculating unit for calculating the amount of translation of the rotor spindle based on the outputs of the two radial displacement detecting means, an inclination motion calculating unit for calculating the amount of inclination motion of the rotor spindle based on the outputs of the two radial displacement detecting means, a translation control unit for outputting a translation control signal for controlling the translation of the rotor spindle based on the output of the translation calculating unit, an inclination motion control circuit for outputting an inclination motion control signal for controlling the inclination motion of the rotor spindle based on the output of the inclination motion calculating unit, and a drive circuit for supplying an exciting current to the two radial magnetic bearings based on the translation control signal and the inclination motion control signal, The working force calculating means comprises, for example, two attraction calculating circuits for calculating attracting forces to be produced by the respective two radial magnetic bearings based on the exciting currents supplied to the respective radial magnetic bearings from the radial direction controllers and on the radial displacement of the rotor spindle, and a working force calculating circuit for calculating a radial working force acting on the tool element based on the attracting forces and the position of center of gravity of the rotor spindle including the tool element.

For example, the two attraction calculating circuits each determine the distances between the rotor spindle and the pair of electromagnets in one radial direction from the displacement of the rotor spindle in said one radial direction detected by the two radial displacement detecting means, determine the attracting forces in said one radial direction of the pair of electromagnets using the distances, exciting currents of the pair of electromagnets and an attraction coefficient thereof and calculate the difference between the attracting forces of the pair of electromagnets to determine the attracting force in said one radial direction of each of the two radial magnetic bearings, and the working force calculating circuit calculates the working force using the outputs of the two attraction calculating circuits, axial distances between the center of gravity of the rotor spindle and the two radial magnetic bearings and the axial distance between the center of gravity of the rotor spindle and the tool element.

DESCRIPTION OF THE PREFERRED EMBODIMENT

An internal grinding machine embodying the present invention will be described below with reference to the drawings.

Figure 1:
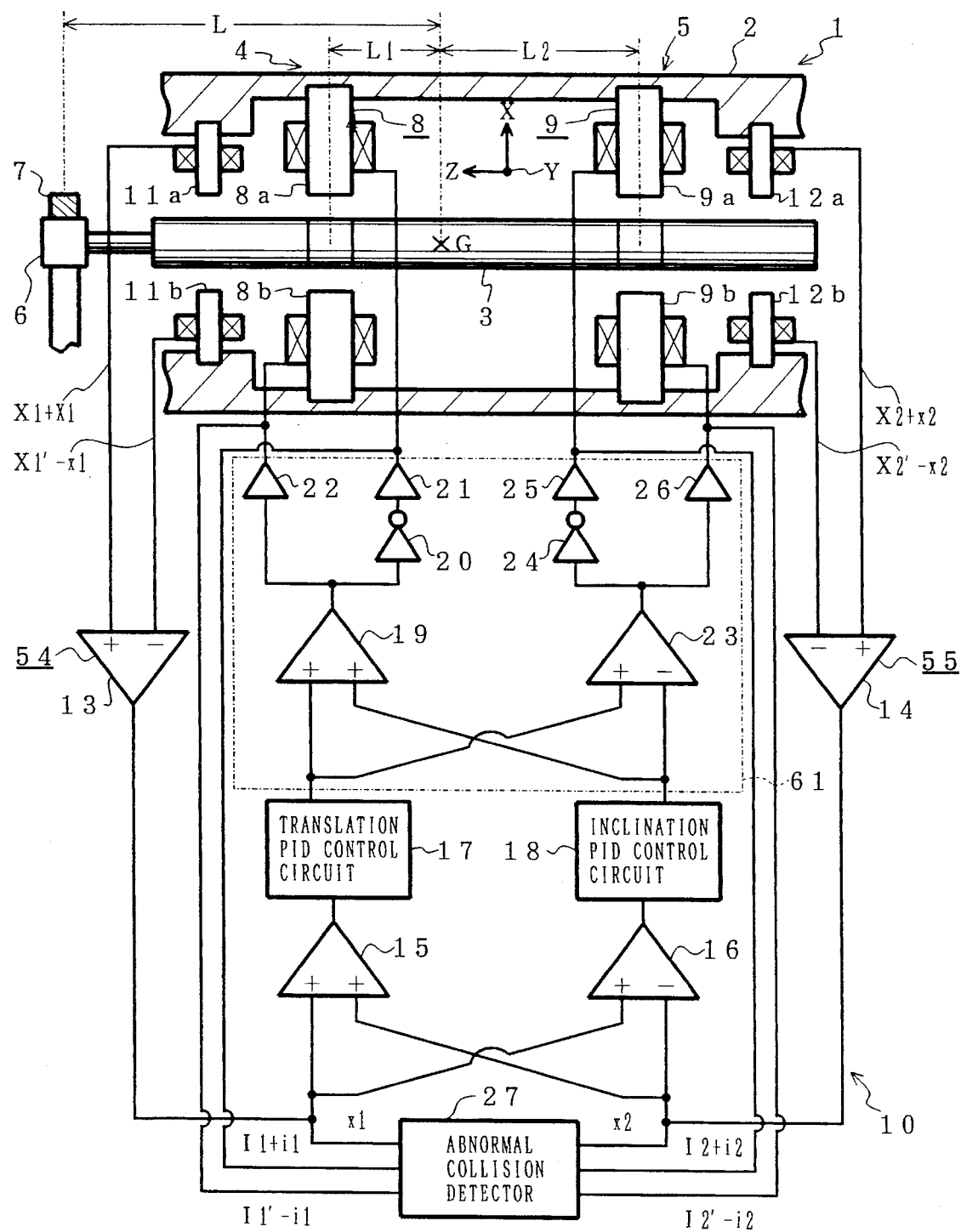
FIG. 1 is a diagram schematically showing the construction of main portion of a spindle device included in an internal grinding machine embodying the invention.
Figure 2:
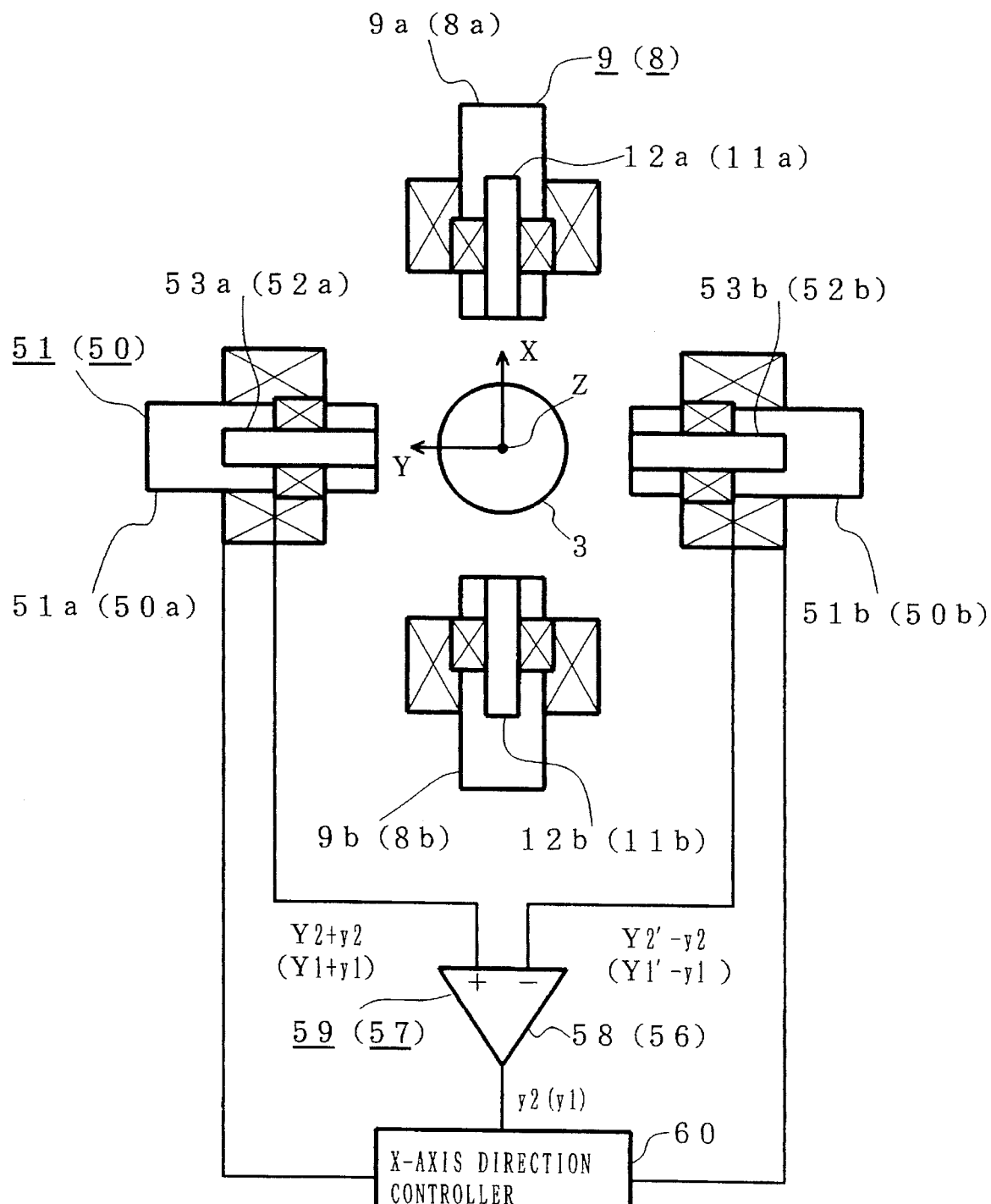
FIG. 2 is a diagram schematically showing the construction of main portion of the spindle device of FIG. 1 as seen from a different direction.

FIGS. 1 and 2 show the main portion of a spindle device 1 included in the internal grinding machine. In the following description, the upper and lower sides of FIG. 1 will be referred to as "upper" and "lower," respectively, the left-hand side of the same drawing as "front," the right-hand side thereof as "rear," and the terms "right" and "left" will be used as the device is seen from the rear forward (as shown in FIG. 2). An axis in the front-rear direction will be referred to as the Z-axis, and the front side of which as the positive direction of the Z-axis. Further an axis in the up-down direction will be referred to as the X-axis, and an axis in the right-left direction as the Y-axis.

The spindle device 1 comprises a rotor spindle 3 and a magnetic bearing device for contactlessly supporting the spindle. The rotor spindle 3 is disposed horizontally within a casing 2, extends in the front-rear direction and has a grinding wheel (tool element) 6 mounted on its forward end. Although not shown, a high-frequency motor for drivingly rotating the rotor spindle 3 at a high speed is housed in the casing 2. The casing 2 is fixed to a movable table controllable by a numerical control device. In the case of the present embodiment, the spindle device 1 is moved forward at a fast feed speed until the grinding wheel 6 enters an annular workpiece 7, fed upward at the fast feed speed until the grinding wheel 6 approaches an inner surface upper portion of the workpiece 7 and thereafter moved upward at a working feed speed to work the inner surface of the workpiece 7 to a specified size.

The magnetic bearing device comprises an axial magnetic bearing (not shown) for contactlessly supporting the rotor spindle 3 in the direction of the Z-axis (axial direction), an axial displacement detector (not shown) for detecting axial displacement of the rotor spindle 3, an axial controller (not shown) for controlling the axial magnetic bearing based on the output of the axial displacement detector, front and rear two radial magnetic bearings 4, 5 for contactlessly supporting the rotor spindle 3 radially thereof, front and rear two radial displacement detectors for detecting radial displacement of the rotor spindle 3 at front and rear two portions thereof, and a radial controller for controlling the radial magnetic bearings 4, 5 based on the outputs of the radial displacement detectors.

The front radial magnetic bearing 4 comprises an X-axis direction magnetic bearing 8 for supporting the rotor spindle 3 with respect to the direction of the X-axis, and a Y-axis direction magnetic bearing 50 for supporting the rotor spindle 3 with respect to the direction of the Y-axis. The X-axis direction bearing 8 comprises a pair of upper and lower X-axis direction electromagnets (first electromagnets) 8a, 8b arranged in the casing 2 at opposite sides of the rotor spindle 3 along the X-axis direction. The Y-axis direction hearing 50 comprises a pair of left and right Y-axis direction electromagnets (second electromagnets) 50a, 50b arranged in the casing 2 at opposite sides of the rotor spindle 3 along the Y-axis direction. Similarly, the rear radial magnetic bearing 5 comprises an X-axis direction magnetic bearing 9 and a Y-axis direction magnetic bearing 51. The bearing 9 comprises a pair of upper and lower X-axis direction electromagnets (first electromagnets) 9a, 9b. The bearing 51 comprises a pair of left and right Y-axis direction electromagnets (second electromagnets) 51a, 51b. Provided in the casing 2 in the vicinity of the front (rear) X-axis direction electromagnets 8a, 8b (9a, 9b) are a pair of upper and lower X-axis direction position sensors first position sensors) 11a, 11b (12a, 12b) arranged at opposite sides of the rotor spindle 3 along the X-axis direction for detecting the position of the rotor spindle 3 with respect to the X-axis direction. Similarly provided in the casing 2 in the vicinity of the front (rear) Y-axis direction electromagnets 50a, 50b (51a, 51b) are a pair of left and right Y-axis direction position sensors (second position sensors) 52a, 52b (53a, 53b) arranged at opposite sides of the rotor spindle 3 along the Y-axis direction, for detecting the position of the rotor spindle 3 with respect to the Y-axis direction.

The outputs of the front pair of X-axis direction position sensors 11a, 11b are fed to a first subtracter (X-axis direction displacement calculating subtracter) 13, which calculates the X-axis direction displacement x1 of front portion of the rotor spindle 3. The output of the front upper position sensor 11a is a steady-state output X1 when the displacement is 0 plus the displacement x1 (X1+x1). The outputs of the front lower position sensor 11b is a steady-state output X1' minus the displacement x1 (X1'−x1). The front x-axis direction position sensors 11a, 11b and the first subtracer 13 constitute a front x-axis direction displacement detector 54. The outputs of the rear pair of X-axis-direction position sensors 12a, 12b are fed to a second subtracter (X-axis direction displacement calculating subtracter) 14, which calculates the X-axis direction displacement x2 of rear portion of the rotor spindle 3. The output of the rear upper position sensor 12a is a steady-state output X2 plus the displacement x2 (X2+x2). The output of the rear lower position sensor 12b is a steady-crate output X2' minus the displacement x2 (x2'−x2). The rear X-axis direction position sensors 12a, 12b and the second subtracter 14 constitute a rear X-axis direction displacement detector 55. The output x1, x2 of the front and rear X-axis direction displacement detectors 54, 55 are fed to an X-axis direction controller 10, which controls the front and rear X-axis direction magnetic bearings 8, 9.

The outputs of the front pair of Y-axis direction position sensors 52a, 52b are fed to a third subtracter (Y-axis direction displacement calculating subtracter) 56, which calculates the Y-axis direction displacement y1 of front portion of the rotor spindle 3. The output of the front left position sensor 52a is a steady-state output Y1 when the displacement is 0 plus the displacement y1 (Y1+y1). The output of the front right position sensor 52b is a steady-state output Y1' minus the displacement y1 (Y1'−y1). The from Y-axis direction position sensors 52a, 52b and the third subtracter 56 constitute a from Y-axis direction displacement detector 57. The outputs of the rear pair of Y-axis direction position sensors 53a, 53b are fed to a fourth subtracter (Y-axis direction displacement calculating subtracter) 58, which calculates the Y-axis direction displacement y2 of rear portion of the rotor spindle 3. The output of the rear left position sensor 53a is a steady-state output y2 plus the displacement y2 (Y2+y2). The output of the rear right position sensor 53b is a steady-state output Y2' minus the displacement y2 (Y2'−y2). The rear Y-axis direction position sensors 53a, 53b and the fourth subtracter 58 constitute a rear Y-axis direction displacement detector 59. The outputs y1, y2 of the front and rear Y-axis direction displacement detectors 57, 59 are fed to a Y-axis direction controller 60, which controls the front and rear Y-axis direction magnetic bearings 50, 51.

The front X-axis direction displacement detector 54 and the front Y-axis direction displacement detector 57 constitute the forementioned front radial displacement detector. The rear X-axis direction displacement detector 55 and the rear Y-axis direction displacement detector 59 constitute the foregoing rear radial displacement detector. The X-axis direction controller 10 and the Y-axis direction controller 60 constitute the aforementioned radial controller.

Since the X-axis and Y-axis direction controllers 10 and 60 are alike, the X-axis direction controller 10 only will be described below.

In the X-axis direction controller 10, the outputs of the first and second subtracters 13, 14 are fed respectively to two input terminals of a first adder (translation calculating unit) 15, which calculates the amount of translation of the rotor spindle 3. The outputs of the first and second subtracters 13, 14 are also fed respectively to two input terminals of a fifth subtracter (inclination motion calculating unit) 16, which calculates the amount of inclination motion of the rotor spindle 3. The first adder 15 feeds an output to a translation PID control circuit 17, which in turn delivers a translation control signal. The output of the fifth subtracter 16 is fed to an inclination motion PID control circuit 18, which in turn produces an inclination motion control signal. The outputs of the two control circuits 17, 18 are fed respectively to two input terminals of a second adder 19, which outputs a control signal for the front X-axis direction magnetic bearing 8. The output of the second adder 19 is fed to the winding of the front upper electromagnet 8a via an inverter 20 and power amplifier 21 and also to the winding of the front lower electromagnet 8b via a power amplifier 22, whereby the value of current to be passed through the windings of these electromagnets 8a, 8b is controlled. The outputs of the two control circuits 17, 18 are also fed respectively to two input terminals of a sixth subtracter 23, which delivers a control signal for the rear X-axis direction magnetic bearing 9. The output of the sixth subtracter 23 is fed to the winding of the rear upper electromagnet 9a via an inverter 24 and power amplifier 25 and also to the winding of the fear lower electromagnet 9b via a power amplifier 26, whereby the value of current through the windings of these electromagnets 9a, 9b is controlled. The second adder 19, sixth subtracter 23, inverters 20, 24 and power amplifiers 21, 22, 25, 26 constitute a drive circuit 61 for driving the electromagnets 8a, 8b, 9a, 9b based on the translation control signal and inclination motion control signal. The translation and the inclination motion of the rotor spindle 3 are controlled separately by controlling the values of currents through the windings of the front and rear X-axis direction electromagnets 8a, 8b, 9a, 9b in this way. The input to the front upper electromagnet 8a, i.e., the output of the power amplifier 21, is a steady-state current value I1 when the X-axis displacement x1 of front portion of the rotor spindle 3 is 0 plus a control current value i1 (I1+i1). The input to the front lower electromagnet 8b, i.e., the output of the power amplifier 22, is a steady-state current value I1' minus the control current value i1 (I1'−i1). The input to the rear upper electromagnet 9a, i.e., the output of the power amplifier 25, is a steady-state current value I2 when the X-axis displacement x2 of rear portion of the rotor spindle 3 is 0 plus a control current value i2 (I2+i2). The input to the rear lower electromagnet 9b, i.e., the output of the power amplifier 26, is a steady-state current value I2' minus the control current value i2 (I2'−i2).

Figure 3:
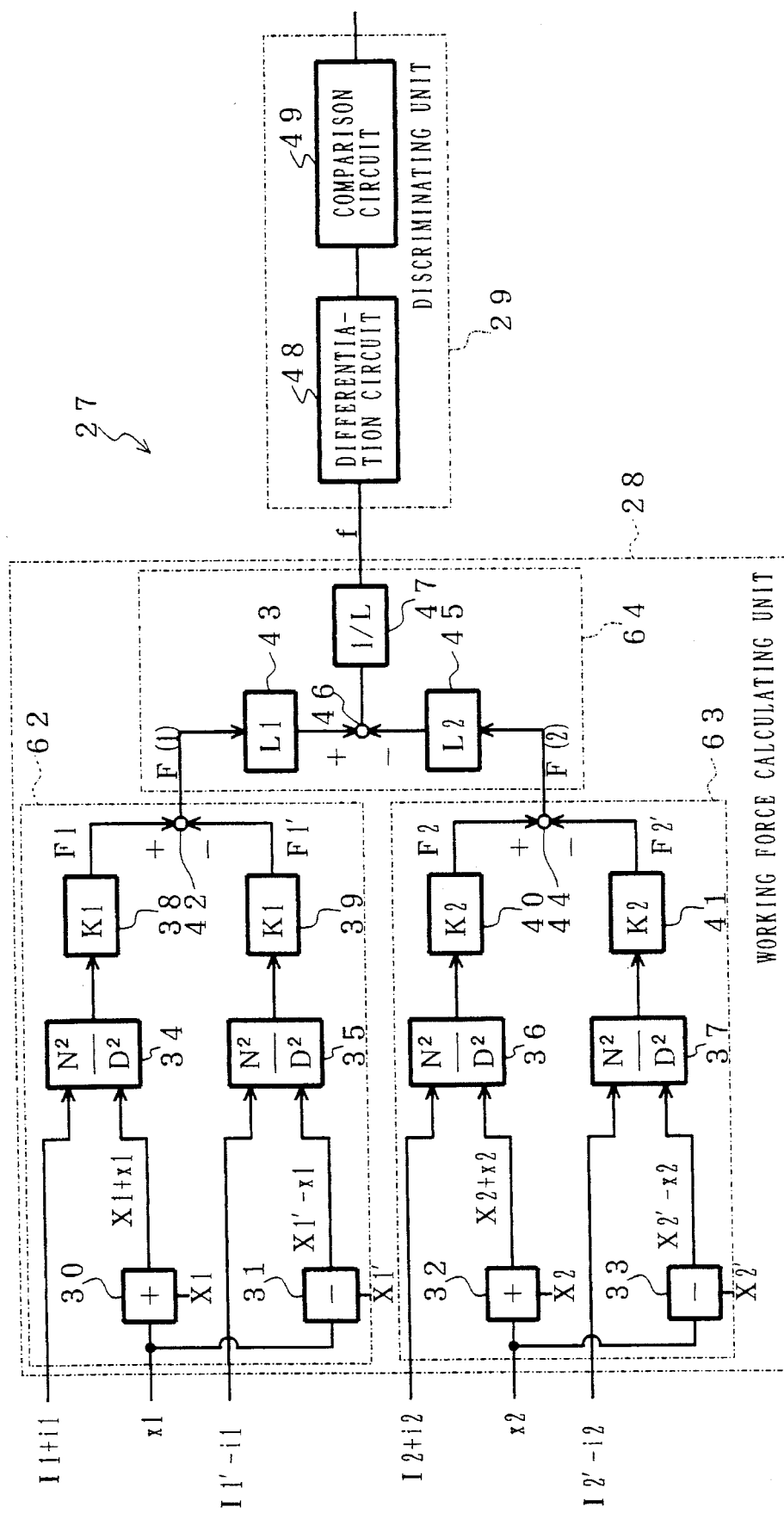
FIG. 3 is a block diagram showing the construction of an abnormal collision detector.

An abnormal collision detector 27 is connected to the X-axis direction controller 10. The outputs of the first and second subtracters 13, 14 and the outputs of the four power amplifiers 21, 52, 25, 26 are fed to the abnormal collision detector 27. The detector 27 is adapted to detect a collision (abnormal collision) of the grinding wheel 6 being fed at the fast speed with the workpiece 7, and comprises a working force calculating unit 28 and a discriminating unit 29 as seen in FIG. 3. The calculating unit 28 calculates the working force f acting on the wheel 6 upon the wheel 6 coming into contact with the workpiece 7 based on the exciting currents of the magnetic bearings 8, 9 and the outputs of the displacement detectors 54, 55. The discriminating unit 29 discerns whether the contact of the griding wheel 6 with the workpiece 7 is normal or abnormal based on variations in the working force calculated by the calculating unit 28. With the present embodiment, the discriminating unit 29 determines the rate of increase of the working force (differential value), compares the increase rate of the working force with a predetermined reference increase rate and construes the contact of the grinding wheel 6 with the workpiece 7 as abnormal when the working force increase rate has exceeded the reference increase rate.

Next with reference to FIGS. 4 and 5, a description will be given of the balance of forces in the X-axis direction while the grinding wheel 6 is not in working operation with no working force acting thereon and while the wheel 6 is in working operation with a working force acting thereon. In the following description, the center of gravity of the rotor spindle 3 including the grinding wheel 6 is indicated at G, and the distance from the center of gravity G to the front electromagnets 8a, 8b in the Z-axis direction will be represented by L1, the distance from the center of gravity G to the rear electromagnets 9a, 9b in the Z-axis direction by L2, and the distance from the center of gravity G to the grinding wheel 6 in the Z-axis direction by L.

Figure 4:
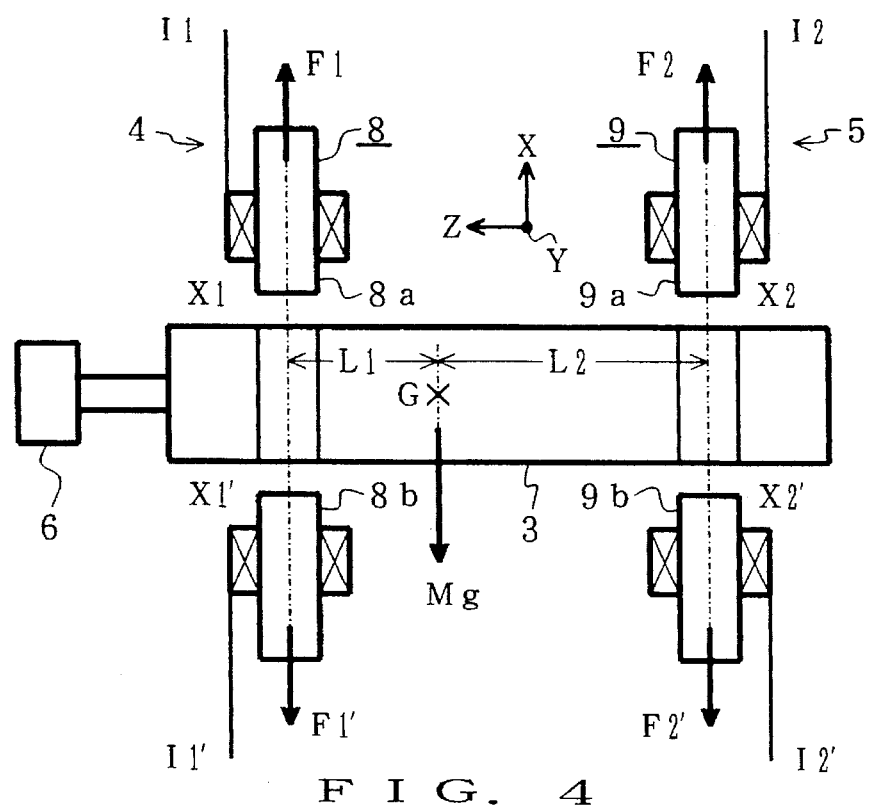
FIG. 4 is a diagram for illustrating balance of forces during non-working.

FIG. 4 shows forces in balance during nonworking. In this case, the displacements of the front and rear sides in the X-axis direction x1, x2 are 0, and the distances from the rotor spindle 3 to the electromagnets 8a, 8b, 9a, 9b in the X-axis direction are steady state values X1, X1', X2, X2', respectively. The exciting currents of the electromagnets 8a, 8b, 9a, 9b have steady-state values I1, I1', I2, I2', respectively. Assuming that the attracting forces of the electromagnets 8a, 8b, 9a, 9b in the X-axis direction are F1, F1', F2, F2', respectively, these forces are expressed $$F1 = K1 \cdot (I1/X1)^2 \tag{1}$$

$$F1' = K1 \cdot (I1'/X1')^2 \tag{2}$$

$$F2 = K2 \cdot (I2/X2)^2 \tag{3}$$

$$F2' = K2 \cdot (I2'/X2')^2 \tag{4}$$

wherein K1 is the attraction coefficient of the front electromagnets 8a, 8b, and K2 is the attraction coefficient of the rear electromagnets 9a, 9b.

Suppose the attracting force of the front upper and lower electromagnets 8a, 8b is F(1), and the attracting force of the two rear electromagnets 9a, 9b is F(2). These forces are then expressed by:

$$F(1) = F1 - F1' \tag{5}$$

$$F(2) = F2 - F2' \tag{6}$$

Assuming that the gravity acting on the rotor spindle 3 is Mg, the forces have the following relation.

$$Mg = F(1) + F(2) \tag{7}$$

$$F(1) \cdot L1 = F(2) \cdot L2 \tag{8}$$

Figure 5:
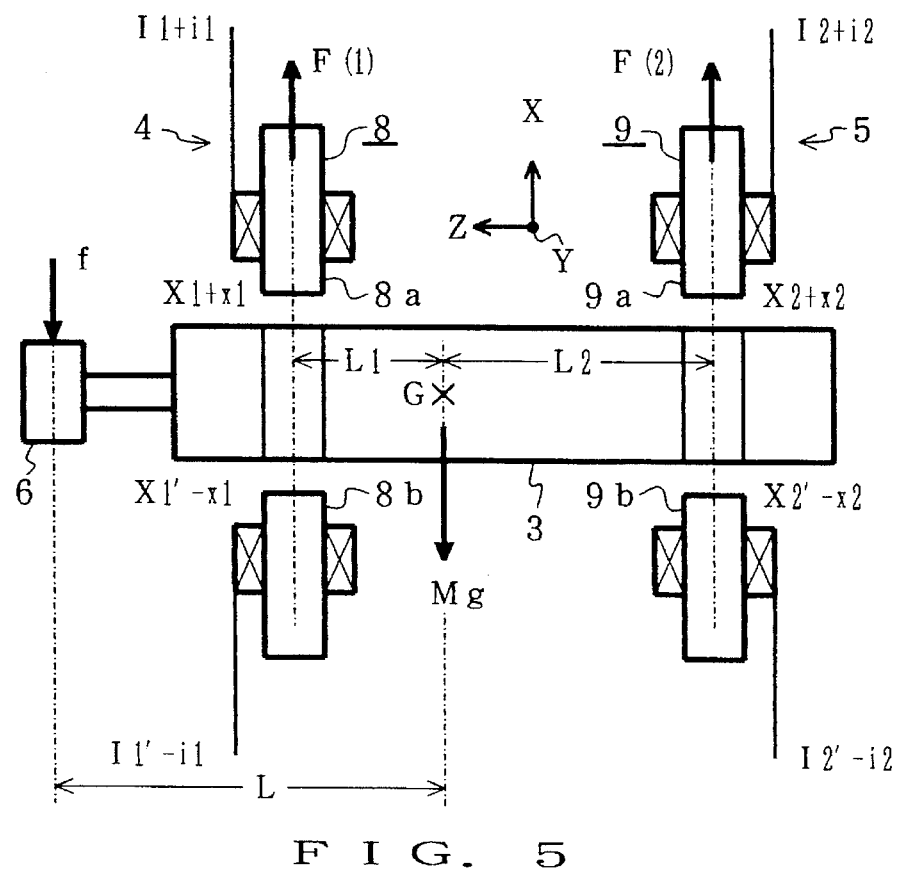
FIG. 5 is a diagram for illustrating balance of forces during working.

FIG. 5 shows forces in balance during working. In this case, it is assumed that the displacements of the front side and the rear side in the X-axis direction are x1, x2. The distances from the rotor spindle 3 to the electromagnets 8a, 8b, 9a, 9b in the X-axis direction are then expressed by (X1+x1), (X1'−x1), (X2+x2), (X2'−x2), respectively. Further the exciting currents of the electromagnets 8a, 8b, 9a, 9b are (I1+i1), (I1'−i1), (I2+i2), (I2'−i2), respectively. The attracting forces F1, F1', F2, F2' of the electromagnets 8a, 8b, 9a, 9b in the X-axis direction are expressed by the following equations like Equations (1) to (4) above.

$$F1 = K1 \cdot ((I1+i1)/(X1+x1))^2 \tag{9}$$

$$F1' = K1 \cdot ((I1'-i1)/(X1'-x1))^2 \tag{10}$$

$$F2 = K2 \cdot ((I2+i2)/(X2+x2))^2 \tag{11}$$

$$F2' = K2 \cdot ((I2'-i2)/(X2'-x2))^2 \tag{12}$$

The attracting force F(1) afforded by the front upper and lower electromagnets 8a, 8b and the attracting force F(2) provided by the rear upper and lower electromagnets 9a, 9b are expressed as follows like Equations (5), (6) given above.

$$F(1) = F1 - F1' \tag{13}$$

$$F(2) = F2 - F2' \tag{14}$$

Assuming that the working force acting on the grinding wheel 6 during working is f, the forces concerned have the following relation.

$$Mg = F(1) + F(2) - f \tag{15}$$

$$F(1) \cdot L1 = F(2) \cdot L2 + f \cdot L \tag{16}$$

From Equation (16), the force f is given by:

$$f = (F(1) \cdot L1 - F(2) \cdot L2)/L \tag{17}$$

The calculating unit 28 calculates the working force f from these relations. Next, the construction and operation of the calculating unit 28 will be described with reference to FIG. 3.

The calculating unit 28 comprises a first attraction calculating circuit 62 for calculating the attracting force of the X-axis direction magnetic bearing 8 of the front radial magnetic bearing 4, a second attraction calculating circuit 63 for calculating the attracting force of the X-axis direction magnetic bearing 9 of the rear radial magnetic bearing 5, and a working force calculating circuit 64 for calculating the working force acting on the grinding wheel 6 based on the attracting forces of the respective X-axis direction bearings 8, 9. The first attraction calculating circuit 62 comprises a third adder 30, seventh subtracter 31, first calculator 34, second calculator 35, first multiplier 38, second multiplier 39 and eighth subtracter 42. The second attraction calculating circuit 63 comprises a fourth adder 32, ninth subtracter 33, third calculator 36, fourth calculator 37, third multiplier 40, fourth multiplier 41 and tenth subtracter 44. The working force calculating circuit 64 comprises a fifth multiplier 43, sixth multiplier 45, eleventh subtracter 46 and seventh multiplier 47.

The output of the first subtracter 13 of the front X-axis direction displacement detector 54, i.e., the X-axis direction displacement X1 of front portion of the rotor spindle 3 is fed to the third adder 30, which calculates the sum of x1 and the steady-state value X1, namely (X1+x1). The displacement x1 is input also to the seventh subtracter 31, which calculates the difference (X1'−x1) between the steady-state value X1' and the displacement. The output of the second subtracter 14 of the rear X-axis direction displacement detector 55, i.e., the X-axis direction displacement x2 of rear portion of the rotor spindle 3, is fed to the fourth adder 32, which adds x2 to the steady-state value X2 to calculate the sum (X2+x2). The displacement x2 is fed also to the ninth subtractor 33, which calculates the difference between the steady-state value x2' and the displacement x2, i.e., (x2'−x2). The exciting current value (I1+i1) of the front upper electromagnet 8a and the output (X1+x1) of the third adder 30 are input to the first calculator 34 to calculate $((I1+i1)/(X1+x1))^2$. The exciting current value (Ii'−i1) of the front lower electromagnet 8b and the output (X1'−x1) of the seventh subtracter 31 are fed to the second calculator 35, which calculates $((I1'−i1)/(X1'−x1))^2$. The exciting current value (I2+i2) of the rear upper electromagnet 9a and the output (X2+x2) of the fourth adder 32 are input to the third calculator 36, which calculates $((I2+i2)/(X2+x2))^2$. The exciting current value (I2'−i2) of the rear lower electromagnet 9b and the output (X2'−x2) of the ninth subtracter 33 are input to the fourth calculator 37, which calculates $((I2'−i2)/(X2'−x2))^2$. The output $((I1+i1)/(X1+x1))^2$ of the first calculator 34 is multiplied by K1 (attraction coefficient) by the first multiplier 38 to calculate F1 of Equation (9). Similarly, the output ((I1'−i1)/(X1'−x1)) of the second calculator 35 is multiplied by K1 by the second multiplier 39 to calculate F1' of Equation (10), the output $((I2+i2)/(X2+x2))^2$ of the third calculator 36 is multiplied by K2 (attraction coefficient) by the third multiplier 40 to calculate F2 of Equation (11), and the output $((I2'−i2)/(X2'−x2))^2$ of the fourth calculator 37 is multiplied by K2 by the fourth multiplier 41 to calculate F2' of Equation (12). The output F1 of the first multiplier 38 and the output F1' of the second multiplier 39 are input to the eighth subtracter 42, which calculates F(1) of Equation (13). The resulting value Is multiplied by L1 by the fifth multiplier 43. The output F2 of the third multiplier 40 and the output F2' of the fourth multiplier 41 are input to the tenth subtracter 44, which calculates F(2) of Equation (14), The resulting value is multiplied by L2 by the sixth multiplier 45. The output F(1)·L1 of the fifth multiplier 43 and the output F(2)·L2 of the sixth multiplier 45 are fed to the eleventh subtracter 46, and the output (F(1)·L1−F(2)·L2) of this subtracter 46 is multiplied by 1/L by the seventh multiplier 47 to calculate the working force f of Equation (17). The working force f is fed to the discriminating unit 29.

With reference to FIG. 3, the discriminating unit 29 comprises a differentiation circuit 48 and a comparison circuit 49. The output of the calculating unit 28, i.e., the working force f, is fed to the differentiation circuit 48 to determine the increase rate of the working force f. A predetermined reference increase rate is given in advance to the comparison circuit 49, which compares the increase rate of working force f from the differentiation circuit 48 with the reference increase rate. If the increase rate of working force f is not greater than the reference increase rate, the circuit 49 construes the contact of the grinding wheel 6 with the workpiece 7 as normal. When the increase rate of working force f has exceeded the reference rate, this is construed as indicating an abnormal contact. The increase rate of working force f is small in a normal case wherein the wheel 6 comes into contact with the workpiece 7 at the working feed speed, whereas the increase rate of working force f is great in an abnormal case wherein the wheel 6 collides with the workpiece 7 at the fast feed speed. Accordingly, abnormal collision only of the wheel 6 can be reliably detected in the manner described above. Upon detecting abnormal collision of the wheel 6, the discriminating unit 29 feeds an abnormality signal to the numerical control device, whereupon the control device stops the movable table or takes a required measure.

Although the working force f acts in the up-down direction in which gravity acts according to the foregoing embodiment, the present invention is of course applicable to a case wherein the working force acts in other direction, for example, in a horizontal direction. In the case where the working force acts horizontally, the abnormal collision detector is added to the Y-axis direction controller 60.

Although the above embodiment has been described with reference to the case wherein the internal grinding machine or like tool is subjected to a radial working force, the invention is of course applicable to a case wherein an axial working force acts on a drilling machine or like tool. In this case, the same abnormal collision detector as in the above embodiment is added to a controller for an axial magnetic bearing to detect axial abnormal collision by calculating the axial working force on the tool based on the exciting current of the bearing and comparing, for example, the increase rate of the working force with a reference increase rate.

What is claimed is:

1. A machine tool comprising a spindle device carrying a tool element attached to the forward end of a rotor spindle drivingly rotatable as supported by a control-type magnetic bearing device, working force calculating means for calculating a working force acting on the tool element upon the tool element coming into contact with a workpiece based on exciting current of a magnetic bearing of the magnetic bearing device, and discriminating means for discerning whether the contact of the tool element with the workpiece is normal or abnormal based on variations in the working force;

wherein the discriminating means determines the rate of increase of the working force, compares the increase rate of the working force with a predetermined reference increase rate and construes the contact of the tool element with the workpiece as abnormal when the working force increase rate has exceeded the reference increase rate.

2. A machine tool as defined in claim 1 wherein the discriminating means comprises a differentiation circuit for calculating the rate of increase of the working force, and a comparison circuit for comparing the working force increase rate calculated by the differentiation circuit with a predetermined reference increase rate and outputting an abnormality signal indicating that the contact of the tool element with the workplace is abnormal when the working force increase rate has exceeded the reference increase rate.

3. A machine tool as defined in claim 1 wherein the control-type magnetic bearing device comprises two radial magnetic bearings arranged respectively at positions spaced apart from each other axially of the spindle for supporting the rotor spindle radially thereof, two radial displacement detecting means arranged respectively at positions spaced apart from each other axially of the spindle for detecting radial displacement of the rotor spindle at their respective positions, and radial control means for controlling the two radial magnetic bearings based on the outputs of the two radial displacement detecting means.

4. A machine tool comprising a spindle device carrying a tool element attached to the forward end of a rotor spindle drivingly rotatable as supported by a control-type magnetic bearing device, working force calculating means for calculating a working force acting on the tool element upon the tool element coming into contact with a workpiece based on exciting current of a magnetic bearing of the magnetic bearing device, and discriminating means for discerning whether the contact of the tool element with the workpiece is normal or abnormal based on variations in the working force;

wherein the control-type magnetic bearing device comprises two radial magnetic bearings arranged respectively at positions spaced apart from each other axially of the spindle for supporting the rotor spindle radially thereof, two radial displacement detecting means arranged respectively at positions spaced apart from each other axially of the spindle for detecting radial displacement of the rotor spindle at their respective positions, and radial control means for controlling the two radial magnetic bearings based on the outputs of the two radial displacement detecting means;

wherein the two radial magnetic bearings each comprise a pair of first electromagnets and a pair of second electromagnets arranged respectively on two radial axes orthogonal to each other in a plane perpendicular to the axis of the rotor spindle; the two radial displacement detecting means each comprise a pair of first position sensors arranged axially adjacent to the pair of first electromagnets for detecting the position of the rotor spindle with respect to a first radial direction, a first subtracter for determining the displacement of the rotor spindle in the first radial direction by calculating the difference between the outputs of the pair of first position sensors, a pair of second position sensors arranged axially adjacent to the pair of second electromagnets for detecting the position of the rotor spindle with respect to a second radial direction, and a second subtracter for determining the displacement of the rotor spindle in the second radial direction by calculating the difference between the outputs of the pair of second position sensors; and the radial control means comprises a first radial direction controller for controlling the attraction of the first electromagnets based on the output of the first subtracter, and a second radial direction controller for controlling the attraction of the second electromagnets based on the output of the second subtracter.

5. A machine tool as defined in claim 4 wherein the first radial direction controller and the second radial direction controller each comprise a translation calculating unit for calculating the amount of translation of the rotor spindle based on the outputs of the two radial displacement detecting means, an inclination motion calculating unit for calculating the amount of inclination motion of the rotor spindle based on the outputs of the two radial displacement detecting means, a translation control unit for outputting a translation control signal for controlling the translation of the rotor spindle based on the output of the translation calculating unit, an inclination motion control circuit for outputting an inclination motion control signal for controlling the inclination motion of the rotor spindle based on the output of the inclination motion calculating unit, and a drive circuit for supplying an exciting current to the two radial magnetic bearings based on the translation control signal and the inclination motion control signal.

6. A machine tool as defined in claim 5 herein the working force calculating means comprises two attraction calculating circuits for calculating attracting forces to be produced by the respective two radial magnetic bearings based on the exciting currents supplied to the respective radial magnetic bearings from the radial direction controllers and on the radial displacement of the rotor spindle, and a working force calculating circuit for calculating a radial working force acting on the tool element based on the attracting forces and the position of center of gravity of the rotor spindle including the tool element.

7. A machine tool as defined in claim 6 wherein the two attraction calculating circuits each determine the distances between the rotor spindle and the pair of electromagnets in one radial direction from the displacement of the motor spindle in said one radial direction detected by the two radial displacement detecting means, determine the attracting forces in said one radial direction of the pair of electromagnets using the distances, exciting currents of the pair of electromagnets and an attraction coefficient thereof and calculate the difference between the attracting forces of the pair of electromagnets to determine the attracting force in said one radial direction of each of the two radial magnetic, bearings, and the working force calculating circuit calculates the working force using the outputs of the two attraction calculating circuits, axial distances between the center of gravity of the rotor spindle and the two radial magnetic bearings and the axial distance between the center of gravity of the rotor spindle and the tool element.

* * * * *